US010055146B1

(12) United States Patent
Natanzon et al.

(10) Patent No.: US 10,055,146 B1
(45) Date of Patent: Aug. 21, 2018

(54) VIRTUAL MACHINE ROLLBACK

(71) Applicant: EMC Corporation, Hopkinton, MA (US)

(72) Inventors: Assaf Natanzon, Tel Aviv (IL); Arieh Don, Newton, MA (US); Philip Derbeko, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/585,258

(22) Filed: Dec. 30, 2014

(51) Int. Cl.
*G06F 12/00* (2006.01)
*G06F 3/06* (2006.01)
*G06F 12/0815* (2016.01)

(52) U.S. Cl.
CPC ............ *G06F 3/0619* (2013.01); *G06F 3/065* (2013.01); *G06F 3/0655* (2013.01); *G06F 3/0688* (2013.01); *G06F 3/0689* (2013.01); *G06F 12/0815* (2013.01); *G06F 2003/0692* (2013.01); *G06F 2212/622* (2013.01)

(58) Field of Classification Search
CPC .... G06F 3/0619; G06F 3/0688; G06F 3/0689; G06F 3/065; G06F 3/0655; G06F 2003/0692; G06F 12/0815
See application file for complete search history.

(56) References Cited

U.S. PATENT DOCUMENTS

| 7,840,753 | B1* | 11/2010 | Booth | G06F 3/0611 |
| | | | | 711/113 |
| 2009/0006801 | A1* | 1/2009 | Shultz | G06F 9/5016 |
| | | | | 711/170 |
| 2009/0150599 | A1* | 6/2009 | Bennett | G06F 11/1441 |
| | | | | 711/103 |
| 2010/0186011 | A1* | 7/2010 | Magenheimer | G06F 12/084 |
| | | | | 718/1 |
| 2011/0202728 | A1* | 8/2011 | Nichols | G06F 9/461 |
| | | | | 711/141 |
| 2013/0332676 | A1* | 12/2013 | Kotla | G06F 12/0848 |
| | | | | 711/129 |
| 2014/0317223 | A1* | 10/2014 | Park | H04L 67/2842 |
| | | | | 709/213 |

* cited by examiner

*Primary Examiner* — Kalpit Parikh
(74) *Attorney, Agent, or Firm* — Krishnendu Gupta; Robert Kevin Perkins

(57) ABSTRACT

A method, system, and computer program product for data consistency, the system comprising receiving an IO from an application at a server cache, writing the IO to a location on the server cache as to not overwrite the previous data to which the IO is directed, updating, in the server cache, the location of the data to correspond to the location where the IO was written and recording the location of the previous data in a log.

14 Claims, 15 Drawing Sheets

VIRTUAL MACHINE ROLLBACK

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY

A method, system, and computer program product for data consistency, the system comprising receiving an IO from an application at a server cache, writing the IO to a location on the server cache as to not overwrite the previous data to which the IO is directed, updating, in the server cache, the location of the data to correspond to the location where the IO was written and recording the location of the previous data in a log.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
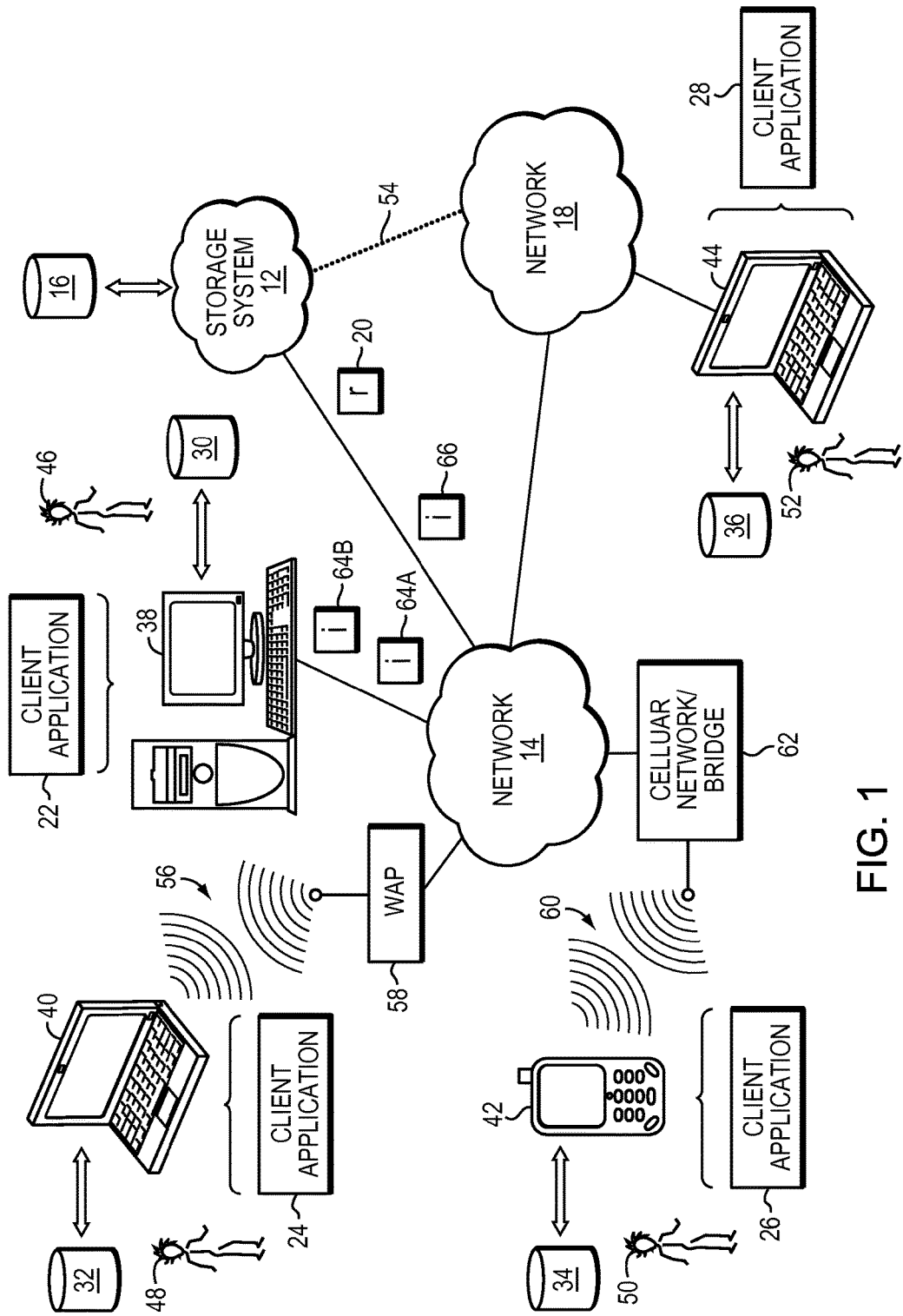
FIG. 1 is a diagrammatic view of a storage system and a data caching process coupled to a distributed computing network, in accordance with an embodiment of the present disclosure.

In many embodiments, it may be desirable to be able to "rewind" a Virtual Machine (VM) back in time. In most embodiments, it may be desirable to rewind a VM for various reasons such as debugging of certain application or forensic investigation of malware. Generally, a virtual machine may have data stored in storage and in memory. Conventionally, it may be possible to take snapshot of VM in hypervisors (for example: VMWare ESX). Typically, a snapshot may represent the state of a VM at a given point in time. Usually, snapshots have drawbacks in that a snapshot takes both time and storage and represents a particular point in time. Generally, for a snapshot to be taken, a virtual machine is paused to ensure data consistency of the VM, which usually means the VM is unusable for some time.

Typically, on fast storage it may be a matter of seconds to take a snapshot, but due to load and other considerations on a production system, snapshots may not be taken frequently. Usually, due to drawbacks such as time and production load, snapshots are taken at pre-defined periods. Generally, returning to a snapshot before bug or malware occurrence may not ensure that the same negative event will not happen again, as the negative event might be depended on users or external events. Thus, conventionally snapshots may not provide a complete solution for rolling back to an earlier point in time.

As well, conventionally, it may be possible to replicate VM Input\Output (IO) sent to storage. Typically, replication is when a copy of IO sent from a production site to storage is saved to enable the saved IO to be rolled back or undone. Generally, a state of an application may consist of two parts, application data stored in memory and application data stored on storage. Conventionally, not all IO is sent to storage and some IO may reside on a host side cache without being sent to storage. Usually, memory of the application or VM on a host or host card may not be replicated or otherwise recorded. Typically, replication of IO sent to storage may not replicate all IO that occurs on the production site as it may not capture the host side memory. Thus, it conventionally may not be possible to roll to every point in time with storage based replication as there may not be a record of VM data stored on memory in the host. Generally, it may not be possible use to host based replication due to the complexities associated with capturing IO without impacting host interactions. Typically, capturing or replicating IO on a host requires changing the host IO stack. Generally, replicating IO on a host, even asynchronously, may slow the production host. Thus, conventionally storage based replication may not provide a complete solution for rolling back to an earlier point in time as the changes to VM memory may not be tracked.

In most embodiments, the current disclosure may enable a system for continuous snapshots. In many embodiments, the current disclosure may enable returning a VM to an earlier point in time in a recorded history. In certain embodiments, a host system may have storage or a cache that holds a record of changes. In some embodiments, changes on a host system may be tracked by not overwriting previously written IO and tracking IO writes in a log. In many embodiments, this may enable tracking of IO on the host without inserting a splitter or other device in the IO stack. In other embodiments, a continuous data protection system of storage with journaling may be used. In further embodiments, continuous data protection of storage may be used with flash and a log to enable rollback. In most embodiments, a virtual machine may continually update its state. In many embodiments, when a virtual machine writes its state, the virtual machine creates a consistent image that may be loaded to revert to that time and state by any virtual machine. In most embodiments, the current disclosure may enable the memory state of a virtual machine to be saved and rolled back to different points in time. In many embodiments, the combination of a memory state of a virtual machine on a host with replication of storage may enable a virtual machine to be rolled back to any point in time.

In some embodiments, a host may have a host based cache system. In many embodiments, a host based cache system may be used to record new writes without overwriting previous writes. In many embodiments, a host based cache system may be used to record new writes without discarding data in previous writes. In most embodiments, writes may be tracked in a log. In certain embodiments, a host based DRAM system with a flash system may be used to enable continuous snapshots. In certain embodiments, writes made to DRAM of a NVDIMM may be recorded to flash. In other embodiments, before a write occurs to a DRAM of a NVDIMM, the previous data in the DRAM may be recorded in flash. In many embodiments, flash may not perform garbage collection and erase cycles. In most embodiments, flash may be enabled to record new writes in a different location than previous writes without deleting or overwriting old data. In some embodiments, flash may record writes by writing to new locations and updating a pointer to location data. In certain embodiments, if a log is kept of the location of the old data it may be possible to "rewind" to previous points in time. In most embodiments, a log may keep locations of old data indexed by time. In certain embodiments, firmware on a host based card may enable keeping of a log, may cause IO data to be written to new locations, and may keep the location of the old IO in the log. In certain embodiments, flash and a log may serve as a back-up to rewind previous writes made to DRAM. In further embodiments, firmware may cause data stored in DRAM to be written to FLASH, the location in flash recorded in a log, before new data is written to the DRAM.

In certain embodiments, an application, such as a virtual machine, may be paused. In many embodiments, a rewind component may rewind host based cache storage for the VM to a particular point in time. In most embodiments, a rewind component may use a log and the knowledge that flash does not overwrite to move an application or virtual machine back in time. In certain embodiments, replication of a VM's storage outside of memory may be used to roll the storage back in time. In many embodiments, the component may notify any other components to update tables or information to the previous point in time. In certain embodiments, the application or virtual machine may be resumed at the previous point in time.

In many embodiments, a card located on a host may serve as a cache storing information and writes. In some embodiments, writes may be stored on a host based cache before those writes are written to storage. In other embodiments, writes may be overwritten on a host based cache and may not be written to storage. In certain embodiments, a card may serve as a read/write cache for attached storage. In most embodiments, using a card on a host as a cache may be beneficial as the card may provide better performance characteristics than the attached storage. In almost all embodiments, a host card may be located at a host or production site or closer to the host than the attached storage.

In many embodiments, a card may have both flash and DRAM. In certain embodiments, data may be written to DRAM and, in the case of a power failure, backed up to the flash. In certain embodiments, a card may have a power back-up to enable data stored in DRAM to be pushed to the flash. In most embodiments, when writes occur to a flash, each write may occur to a different location in the flash. In at least some embodiments, old data may still exist on the flash and a pointer to the location of the data may be updated. In alternative embodiments, flash may write in a new location and limit writes to previously written locations to limit wear on the flash.

In many embodiments, the write pattern of a card with flash may be dictated by firmware on the card. In certain embodiments, it may be possible to update the firmware to ensure that old data is not overwritten and new data is written to new locations. In other embodiments, firmware may cause data stored in DRAM storage to be written to FLASH and the write recorded in a log before the DRAM is overwritten. In many embodiments, a log may be used to record locations of old data. In most embodiments, a log may serve to record IO transactions to a host based card. In at least some embodiments, a log may enable transactions to be rolled back to a previous point in time. In most embodiments, a log may have a series of pointers and timestamps to denote what data on a flash card correspond to different periods in time.

In some embodiments, an application on the host may be able to interface with a host card and a log to create a previous point in time using the log and data on a card. In many embodiments, as the previous point in time may be created using pointers, it may be almost instantaneous to create the previous point in time. In most embodiments, the range of the point in times accessed by the virtual machine or application may be limited by the size of the cache on the server. In many embodiments, a host based card may enable host based writes to be rewound backwards in time.

In further embodiments, a hypervisor may write IO to a host base cache card. In certain embodiments, the hypervisor may segregate writes from different virtual machines to different areas in memory. In some embodiments, multiple virtual machines may be rewound using a log as a hypervisor may enable a log to be segregate IO according to which virtual machine the IO belongs. In further embodiments, a host based log, flash, and storage based replication may be used to roll a virtual machine state back to a previous point in time.

In many embodiments, a virtual machine may have its disk image stored on storage outside of memory. In most embodiments, it may be possible to keep a replication log of each IO written to storage to enable the IOs to be undone to move the storage to a previous point in time. In certain embodiments, a replication solution such as EMC RecoverPoint may enable storage to be rolled back to a previous point in time. In other embodiments, a replication solution such as EMC's SRDF may be used to roll storage back to a previous point in time. In further embodiments, other replication solutions may be used to roll storage back to a previous point in time.

A description of journaling, replication and some techniques associated with journaling and replication may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to the example embodiment of FIG. 1, there is data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

In the embodiment of FIG. 1, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

In the example embodiment of FIG. 1, the instruction sets and subroutines of data caching process 10, which may be stored on storage device 16 included within storage system 12, may be executed by one or more processors and one or more memory architectures included within storage system 12. Storage device 16 may include but is not limited to: a hard disk drive; a tape drive; an optical drive; a RAID device; a random access memory (RAM); a read-only memory (ROM); and all forms of flash memory storage devices. Network 14 may be connected to one or more secondary networks (e.g., network 18), examples of which may include but are not limited to: a local area network; a wide area network; or an intranet, for example.

In the embodiment of FIG. 1, various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

In the embodiment of FIG. 1, the instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. In other embodiments, examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown). In the example embodiment of FIG. 1, users 46, 48, 50, 52 may access storage system 12 directly through network 14 or through secondary network 18. Further, storage system 12 may be connected to network 14 through secondary network 18, as illustrated with link line 54.

In the embodiment of FIG. 1, the various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

In the embodiment of FIG. 1, the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection. Client electronic devices 38, 40, 42, 44 may each execute an operating system, examples of which may include but are not limited to Microsoft Windows™, Microsoft Windows CE™, Redhat Linux™, or a custom operating system.

Figure 2:
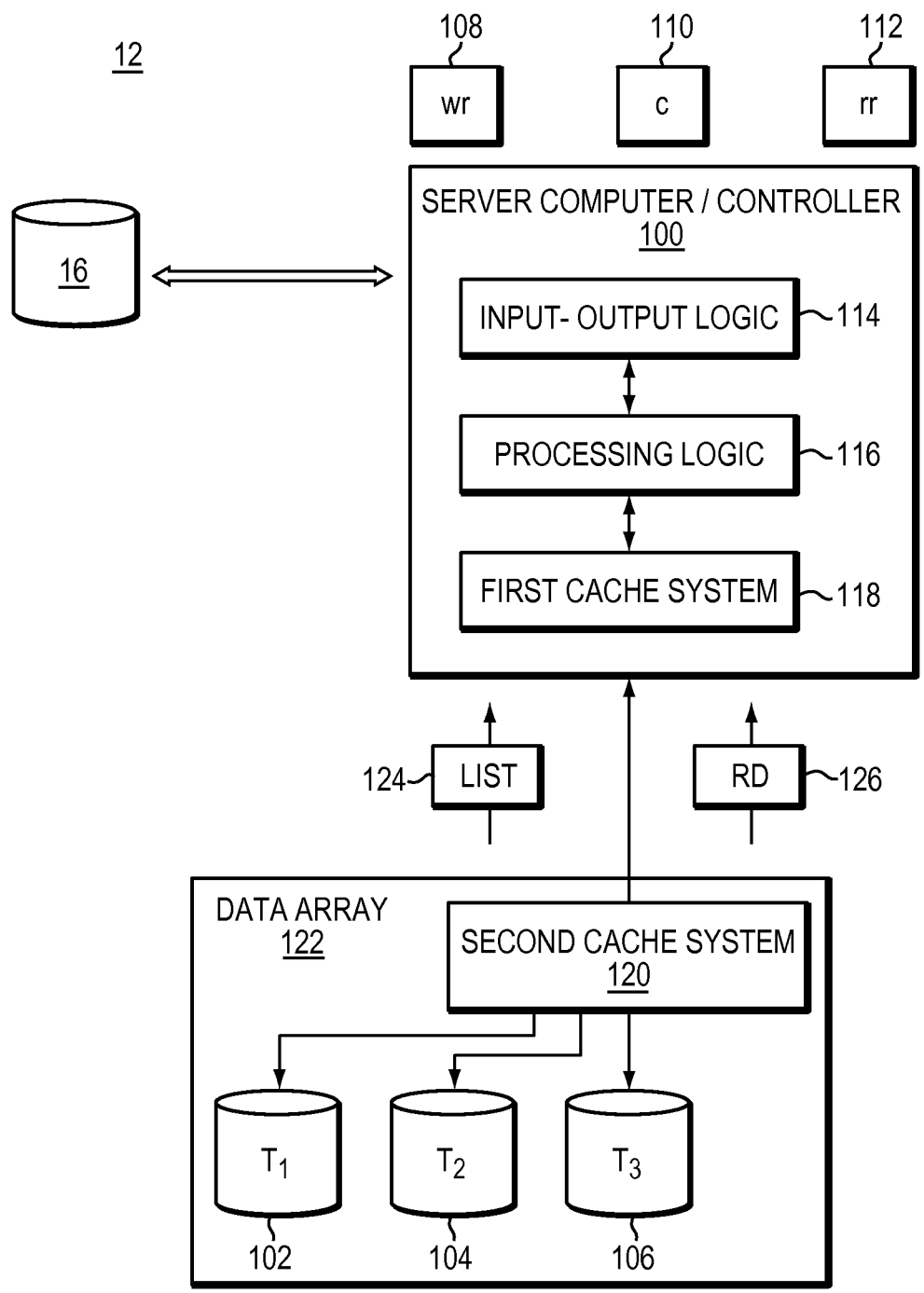
FIG. 2 is a diagrammatic view of the storage system of FIG. 1, in accordance with an embodiment of the present disclosure.

Data Caching Process:

Referring also to the example embodiment of Figure FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

In the example embodiments of FIGS. 1 and 2, storage targets 102, 104, 106, 108 are discussed above as being configured in a RAID 0 or RAID 1 array, this is for illustrative purposes only and is not intended to be a limitation of this disclosure, as other configurations are possible. In other embodiments, storage targets 102, 104, 106, 108 may be configured as a RAID 3, RAID 4, RAID 5 or RAID 6 array.

In the example embodiments of FIGS. 1 and 2, storage system 12 is shown to include four storage targets (e.g. storage targets 102, 104, 106, 108), for illustrative purposes only and is not intended to be a limitation of this disclosure. In other embodiments, the number of storage targets may be increased or decreased depending upon e.g. the level of redundancy/performance/capacity required.

In the example embodiments of FIGS. 1 and 2, Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

In the example embodiments of FIGS. 1 and 2, storage system 12 is shown to include one coded target (e.g., coded target 110). In other embodiments, the number of coded targets may be increased or decreased depending upon e.g. the level of redundancy/performance/capacity required. In further embodiments, examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

In most embodiments, the manner in which a storage system 1, such as storage system 12, is implemented may vary depending upon e.g. the level of redundancy/performance/capacity required. In certain embodiments, storage system 12 may be a RAID device in which server computer/controller 100 is a RAID controller card and storage targets 102, 104, 106, 108 and/or coded target 110 are individual "hot-swappable" hard disk drives. In other embodiments, a RAID device may include but is not limited to an NAS device. In further embodiments, storage system, such as storage system 12, may be configured as a SAN, in which server computer/controller may be e.g., a server computer and storage targets and/or coded target May be a RAID device and/or computer-based hard disk drive. Further still, one or more of storage targets and/or coded target may be a SAN.

In the example embodiments of FIGS. 1 and 2, storage system 12 is configured as a SAN and the various components of storage system 12 (e.g. server computer/controller 100, storage targets 102, 104, 106, 108, and coded target 110) may be coupled using the network infrastructure may include but are not limited to an Ethernet (e.g., Layer 2 or Layer 3) network, a fiber channel network, an InfiniBand network, or any other circuit switched/packet switched network.

In the example embodiments of FIGS. 1 and 2, Storage system 12 may execute all or a portion of data caching process 10. In these embodiments, the instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. In these embodiments, storage device 16 may include but is not limited to: a hard disk drive; a tape drive; an optical drive; a RAID device; a random access memory (RAM); a read-only memory (ROM); and all forms of flash memory storage devices.

In the example embodiments of FIGS. 1 and 2, various data requests (e.g. data request 20) may be generated. In certain embodiments, these data requests may be sent from client applications to a storage system. In other embodiments, when a server computer/controller is configured as an application server, data requests may be internally generated within server computer/controller. In other embodiments, examples of a data request may include but are not limited to a data write request (i.e. a request that content be written to a storage system) and data read request (i.e. a request that content be read from a storage system).

In some embodiments, a Server computer/controller may include input-output logic 122 (e.g., a network interface card), processing logic, and first cache system. In other embodiments, a first cache system may include but are not limited to a volatile, solid-state, cache memory system (e.g., a dynamic RAM cache memory system) and/or a non-volatile, solid-state, cache memory system (e.g., a flash-based, cache memory system).

In the example embodiments of FIGS. 1 and 2, during operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. In certain embodiments, processing logic may store content within a first cache system.

In the example embodiments of FIGS. 1 and 2, depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache).

In other embodiments, processing logic may calculate and store coded data on coded target (included within non-volatile, electromechanical memory system) that may allow for the regeneration of data lost/corrupted on one or more of storage targets. In further embodiments, if processing logic was included within a RAID controller card or a NAS/SAN controller, processing logic may calculate and store coded data on coded target 110. In alternative embodiments, if processing logic was included within e.g., an applications server, data array may calculate and store coded data on coded target.

In the example embodiments of FIGS. 1 and 2, examples of second cache system 128 may include but are not limited to a volatile, solid-state, cache memory system (e.g., a dynamic RAM cache memory system) and/or a non-volatile, solid-state, cache memory system (e.g., a flash-based, cache memory system). In the embodiments of FIGS. 1 and 2, the combination of second cache system 128 and non-volatile, electromechanical memory system 112 may form data array 130, wherein first cache system 126 may be sized so that the number of times that data array 130 is accessed may be reduced. In these embodiments, by sizing first cache system 126 so that first cache system 126 retains a quantity of data sufficient to satisfy a significant quantity of data requests (e.g., data request 20), the overall performance of storage system 12 may be enhanced. In certain embodiments, a first cache system may be a content-aware cache system.

In the example embodiments of FIGS. 1 and 2, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced. As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in further embodiments, addition to being executed on server computer/controller 100, some or all of the instruction sets and subroutines of data caching process 10 may be executed by one or more processors (not shown) and one or more memory architectures (not shown) included within data array 130.

Figure 3:
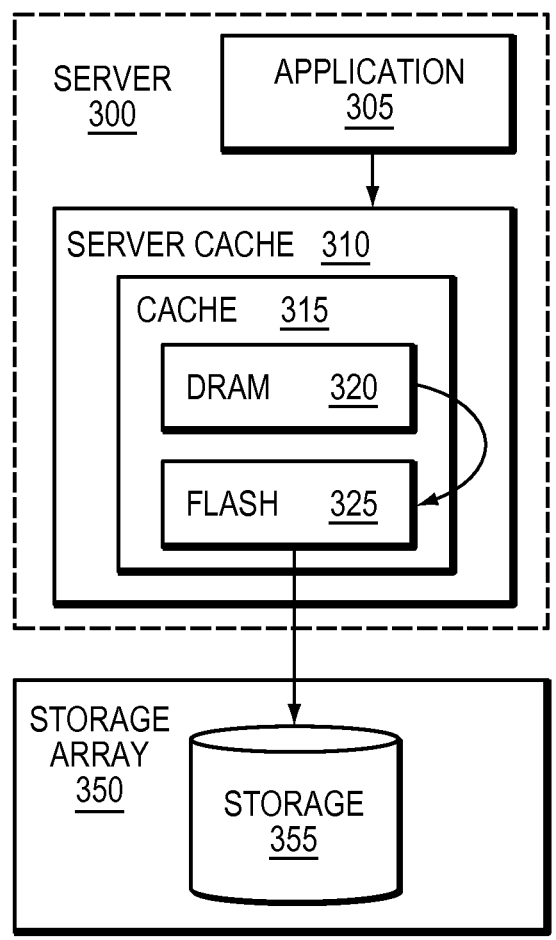
FIG. 3 is a simplified illustration of a server, a server cache, and a storage array, in accordance with an embodiment of the present disclosure.

Refer now to the example embodiment of FIG. 3, which illustrates a sample server or production site with a server based cache. In the example embodiment of FIG. 3, server 300 has application 305 and server cache 310. Server cache 310 has cache 315, which has DRAM 320 and flash 325. Server 300 is also communicatively coupled to storage array, which has storage 355. In this embodiment, Application 305 writes IO 307, which is stored in server cache 310.

Figure 4:
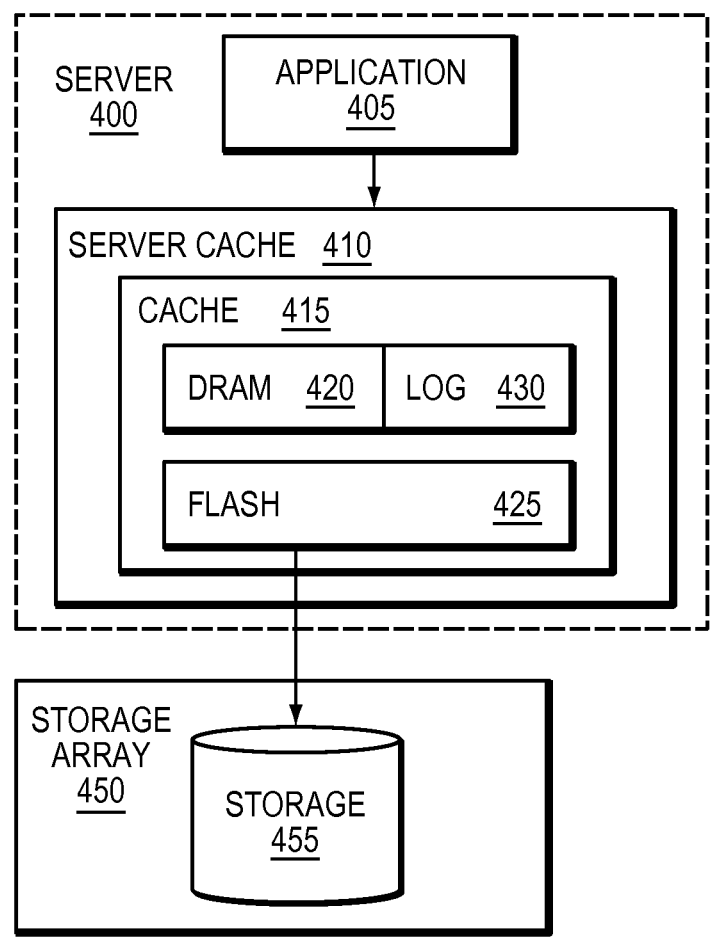
FIG. 4 is a simplified illustration of a server, a server cache with a log, and a storage array, in accordance with an embodiment of the present disclosure.

Refer now to the example embodiment of FIG. 4, which illustrates a sample server or production site with a server based cache. In the example embodiment of FIG. 4, server 400 has application 405 and server cache 410. Server cache 410 has cache 415, which has firmware 412, DRAM 420, flash 425, and log 430. Server 400 is also communicatively coupled to storage array which has storage 355. In certain embodiments, a log may be implemented on FLASH.

Figure 8:
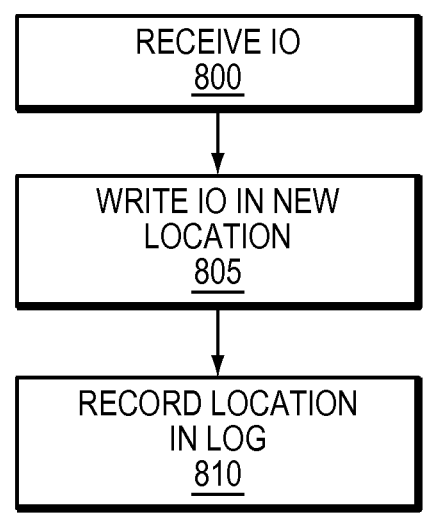
FIG. 8 is a simplified example of a method for storing new data without overwriting old data, in accordance with an embodiment of the present disclosure.

Refer now as well to the example embodiment of FIG. 8. In these embodiments, Application 405 writes IO 407. Server cache 410 receives IO 407 (step 800). Server cache 410 writes IO 407 in a new location (step 805). Server cache 410 records the information about the old data in log 430 (step 830). In these example embodiments, firmware 412 instructs server cache 410 to write the IO in a new location and record the information about the previous IO data in a log.

Figure 5:
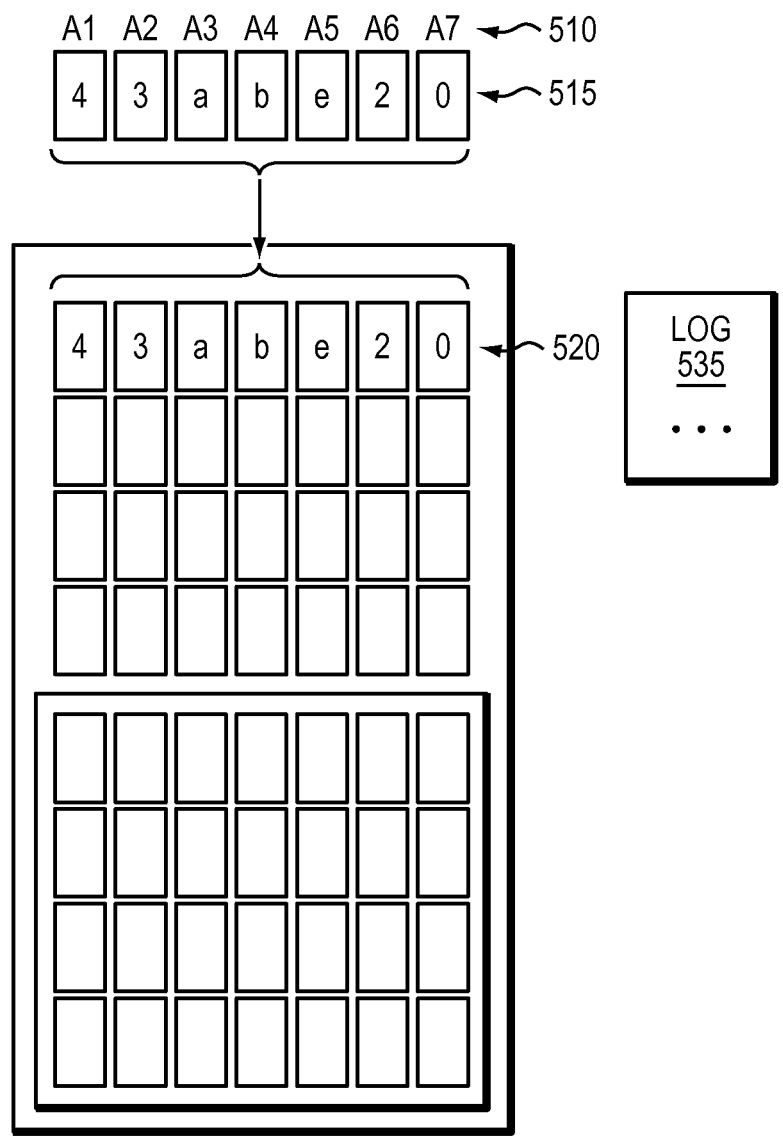
FIG. 5 is a simplified embodiment of flash with a log storing data, in accordance with an embodiment of the present disclosure.

Refer now to the example embodiment of FIG. 5, which illustrates a memory device. In the example embodiment of FIG. 5, memory device 500 stores IO data. Memory location A1-A7 510 currently holds values 43abe20 515 at time T1. These values are stored in location 520 in memory device 500. Log 535 indicates locations of data that have been overwritten by new IOs.

Figure 6:
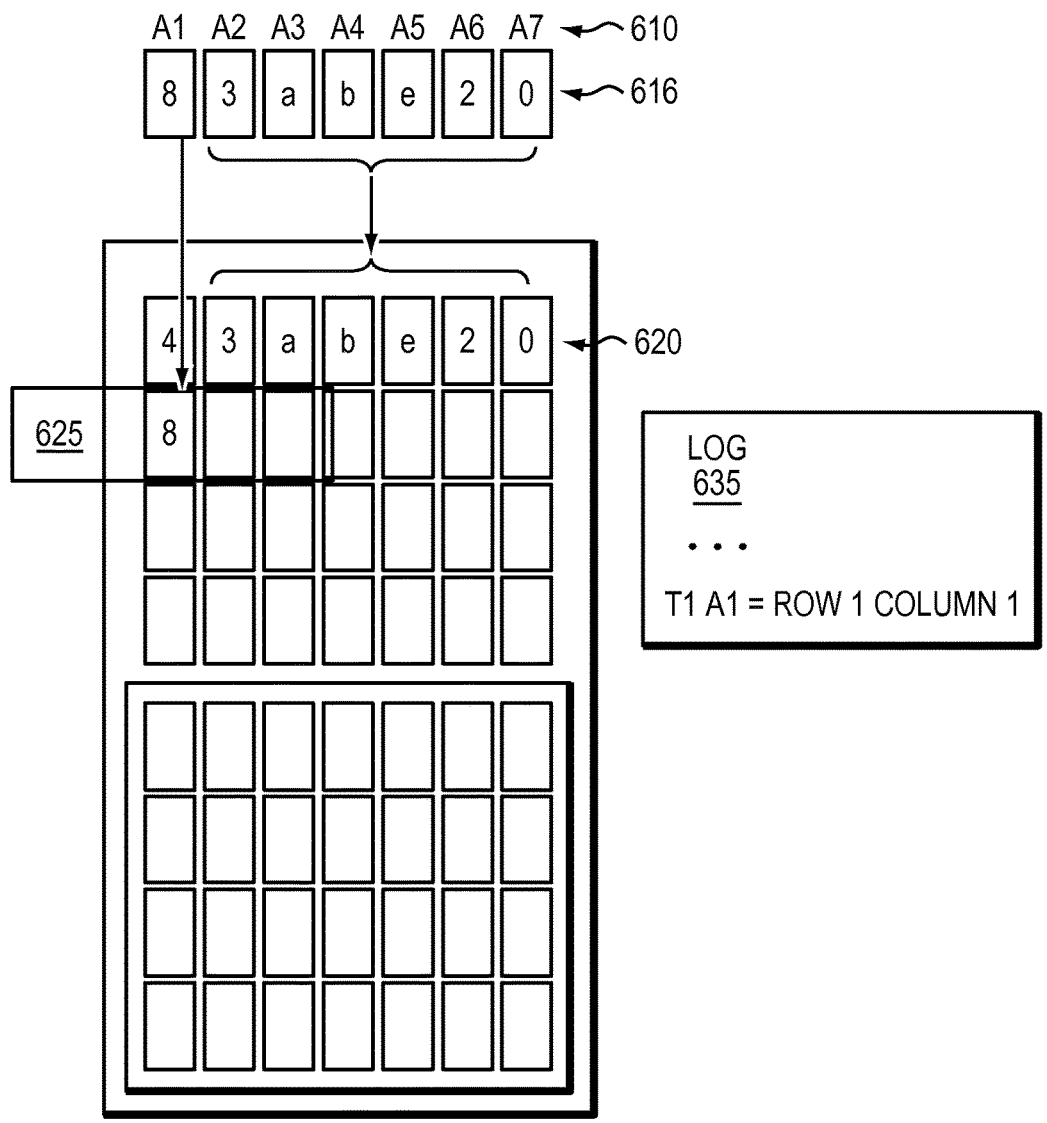
FIG. 6 is a simplified embodiment of flash storing a new write without deleting old data and recording the write in a log, in accordance with an embodiment of the present disclosure.

Refer now to the example embodiments of FIGS. 6 and 8, which illustrate receiving a new IO and recording the location of an old IO. In the example embodiments of FIGS. 6 and 8, IO 607 with a value of 8 is received at time T2 (step 800). The value 8 of IO 607 is written in new location 625, which is row 2 column 1 (step 805). The location of the old value for A1 is recorded in log 635 (step 810).

Figure 7:
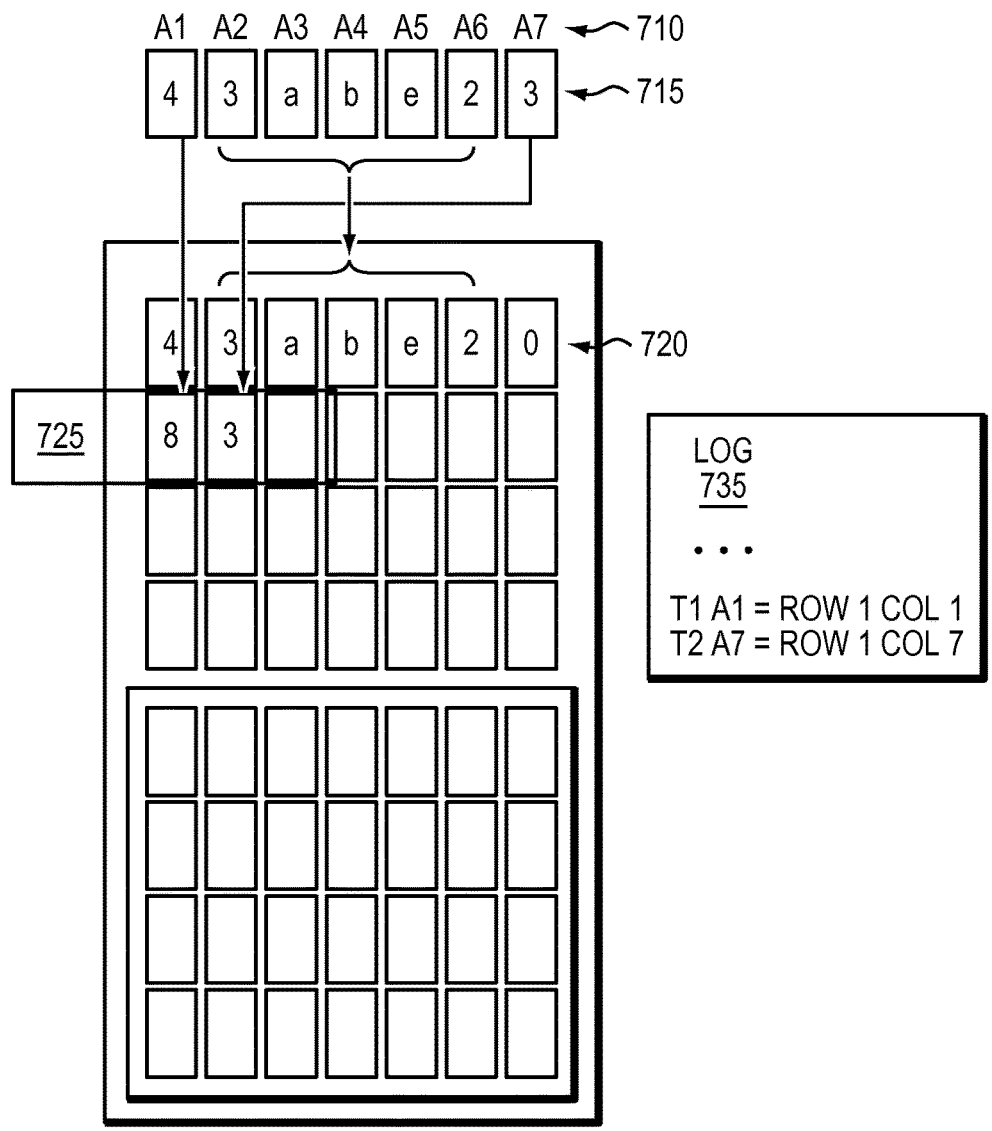
FIG. 7 is a simplified embodiment of flash storing a new write without deleting old data and recording the write in a log, in accordance with an embodiment of the present disclosure.

Refer now to the example embodiments of FIGS. 7 and 8, which illustrate receiving a new IO and recording the location of an old IO. In the example embodiments of FIGS. 7 and 8, IO 6707 with a value of 3 is received at time T3 (step 800). The value 3 of IO 707 is written in new location 725, which is row 2 column 2 (step 805). The location of the old value for A1 is recorded in log 735 (step 810).

Figure 9:
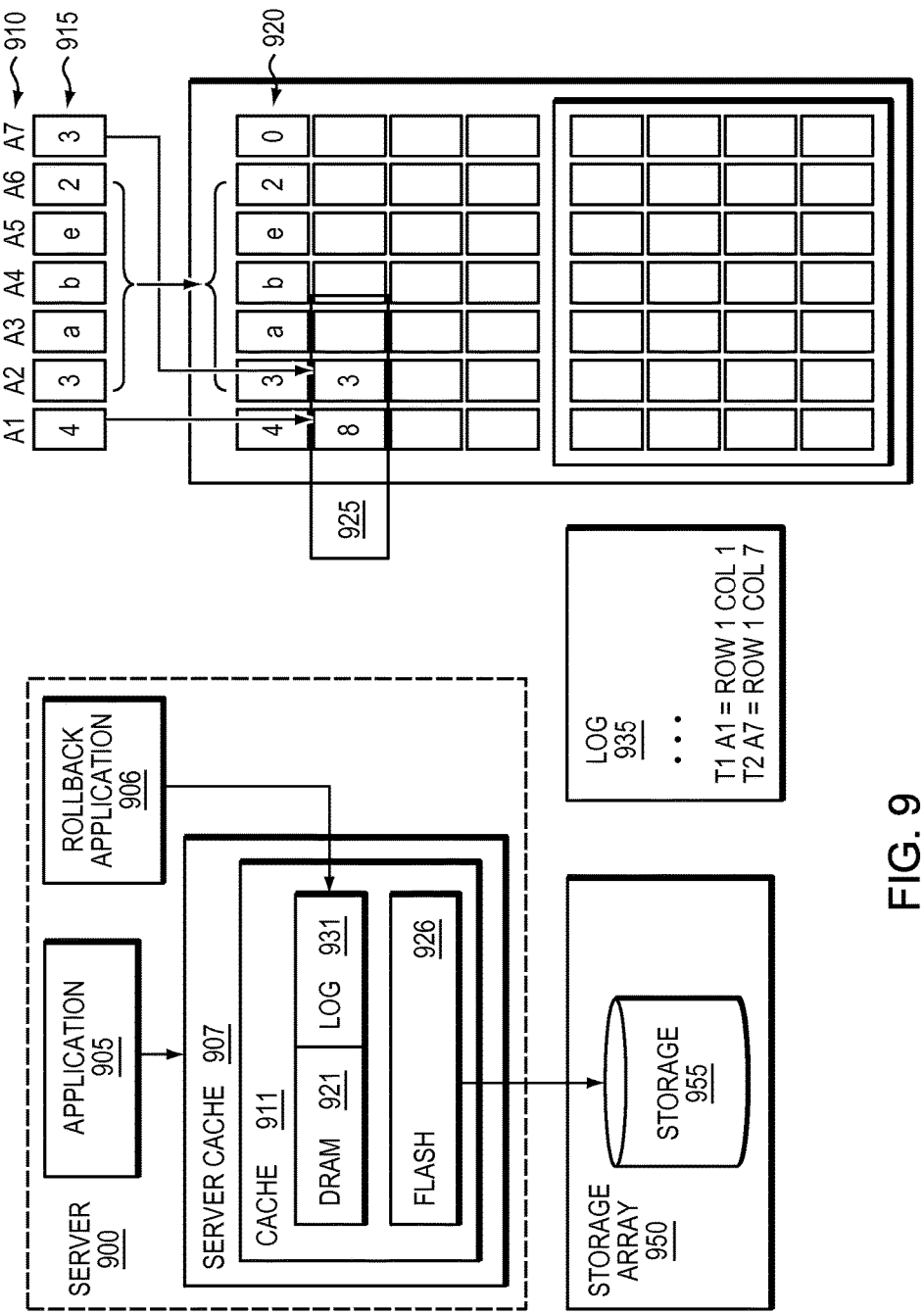
FIG. 9 is a simplified illustration of a server, a server cache with a log, and a rollback application, in accordance with an embodiment of the present disclosure.
Figure 11:
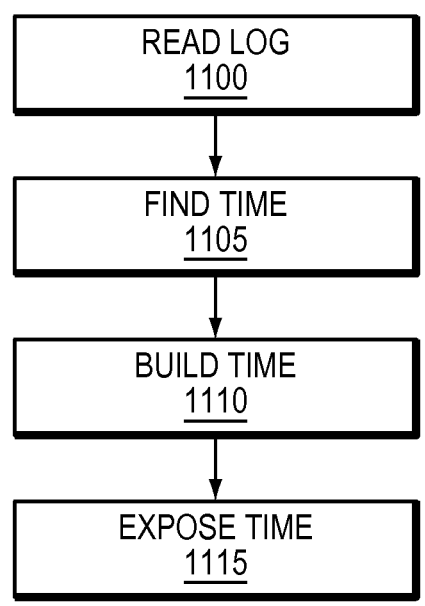
FIG. 11 is a simplified example of a method for rolling back to a previous point in time using a log, in accordance with an embodiment of the present disclosure.

Refer now to the example embodiment of FIGS. 9 and 11, which illustrate a rollback application. In these example embodiments, server 900 has rollback location 906 and server cache 907. Server cache 907 has cache 911 which has DRAM 921, Flash 926, and Log 931. Log 931 may also be viewed as log 935. Cache 911 may also be viewed as cache 912. Cache 912 has locations A1-A7 910, values 915 stored in these locations, and locations 920 and 925, which represent where these locations are stored on cache 912. In these example embodiments, it is desired to return to time T1. Rollback application 906 reads log 935 (step 1110). Rollback application 935 finds time T1 in log 935 (step 1105).

Figure 10:
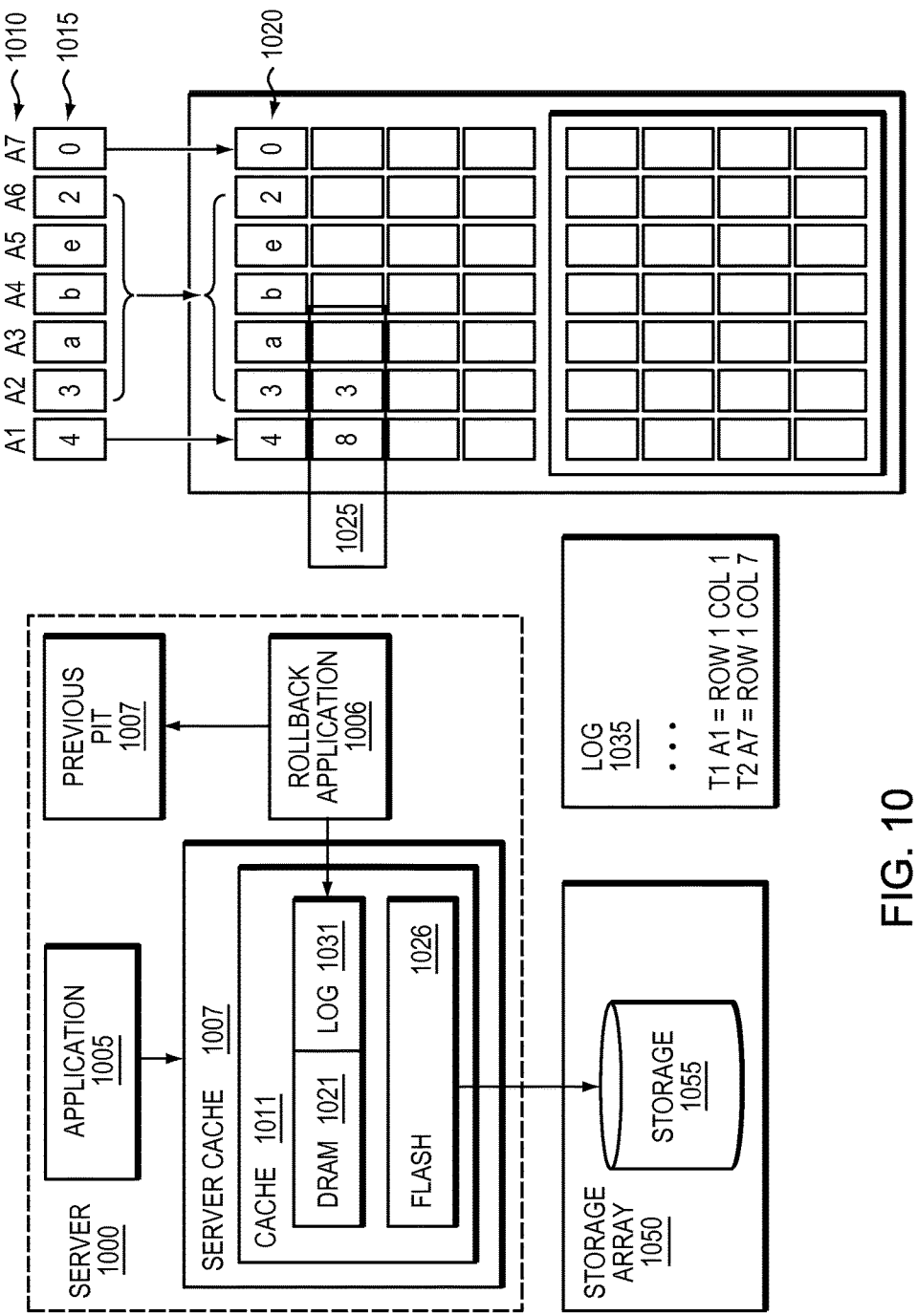
FIG. 10 is a simplified illustration of a rolling to a previous point in time using a log and a rollback application, in accordance with an embodiment of the present disclosure.

Refer now to the example embodiments of FIGS. 10 and 11. Rollback application 1006 builds time 1007 (step 1110). Rollback application 1006 exposes previous point in time 1007 to application 1005 (step 1115). Application 1005 now has been rolled back to the selected previous point in time with respect to the memory.

Figure 12:
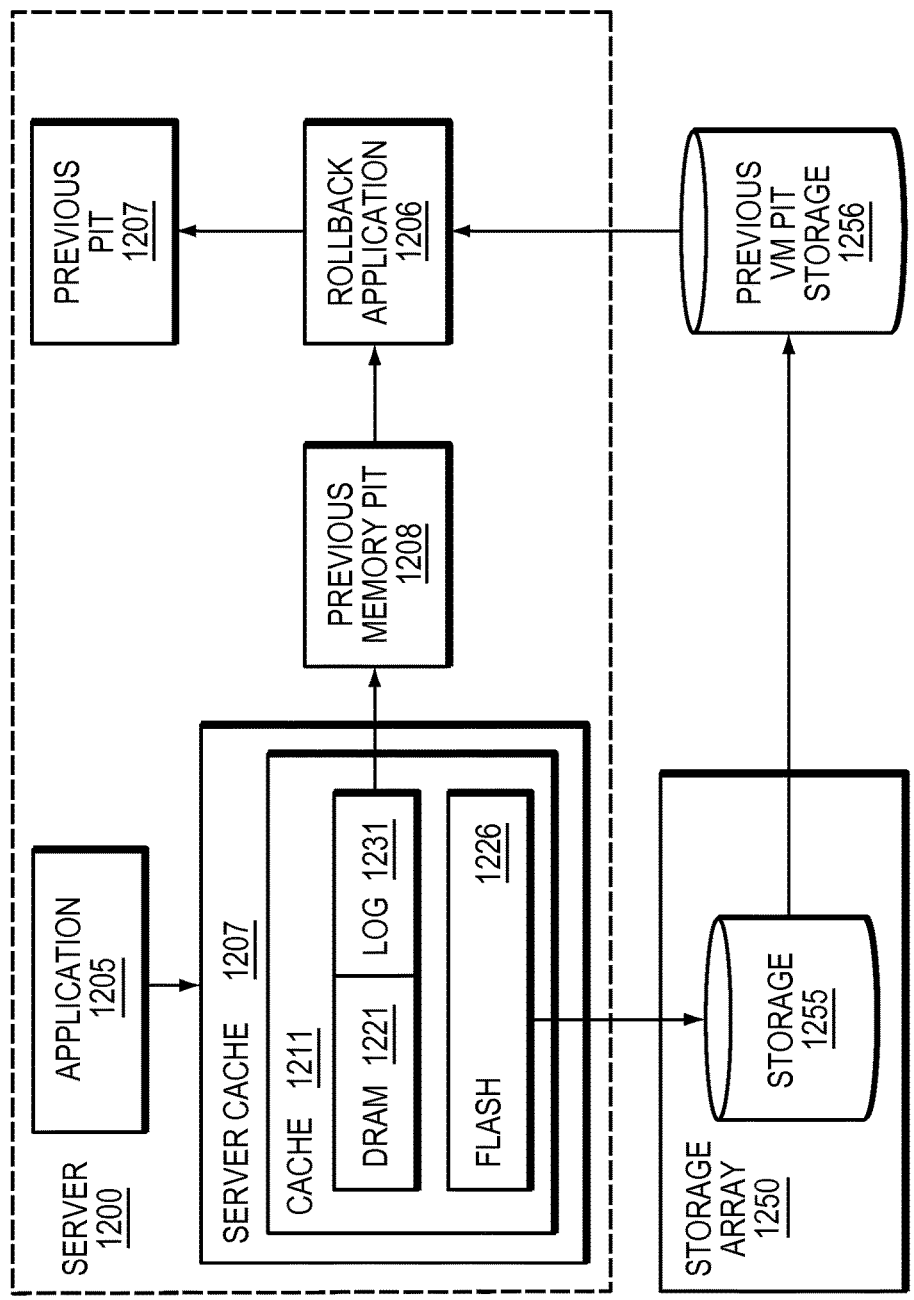
FIG. 12 is an alternative simplified illustration of a rolling to a previous point in time using a log and a rollback application, in accordance with an embodiment of the present disclosure.
Figure 13:
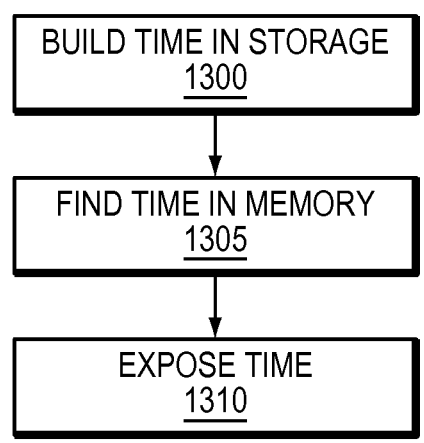
FIG. 13 is an alternative simplified example of a method for rolling back to a previous point in time using a log, in accordance with an embodiment of the present disclosure.

Refer now to the example embodiments of FIGS. 12 and 13, which illustrate rolling back a point in time in storage an in memory. Previous point in time 1256 is built for storage (step 1300). Previous point in time 1208 is built for memory (step 1305). Rollback application exposes previous point in time 1207, which is built using previous memory 1208 and previous VM PIT storage 1265 (1300).

In certain embodiments, IO sent to storage for an application may be replicated. In an embodiment, the IO may be replicated using a splitter. In other embodiments, IO may be replicated using a different replication technique. In most embodiments, replication may offer the ability to roll the image or storage back in time by applying or unapplying IO to the image. In many embodiments, by rolling a replicated image back in time in combination with rolling memory back in time using a log, a VM or application may be rolled back to any point in time recorded by the image and memory log.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 14:
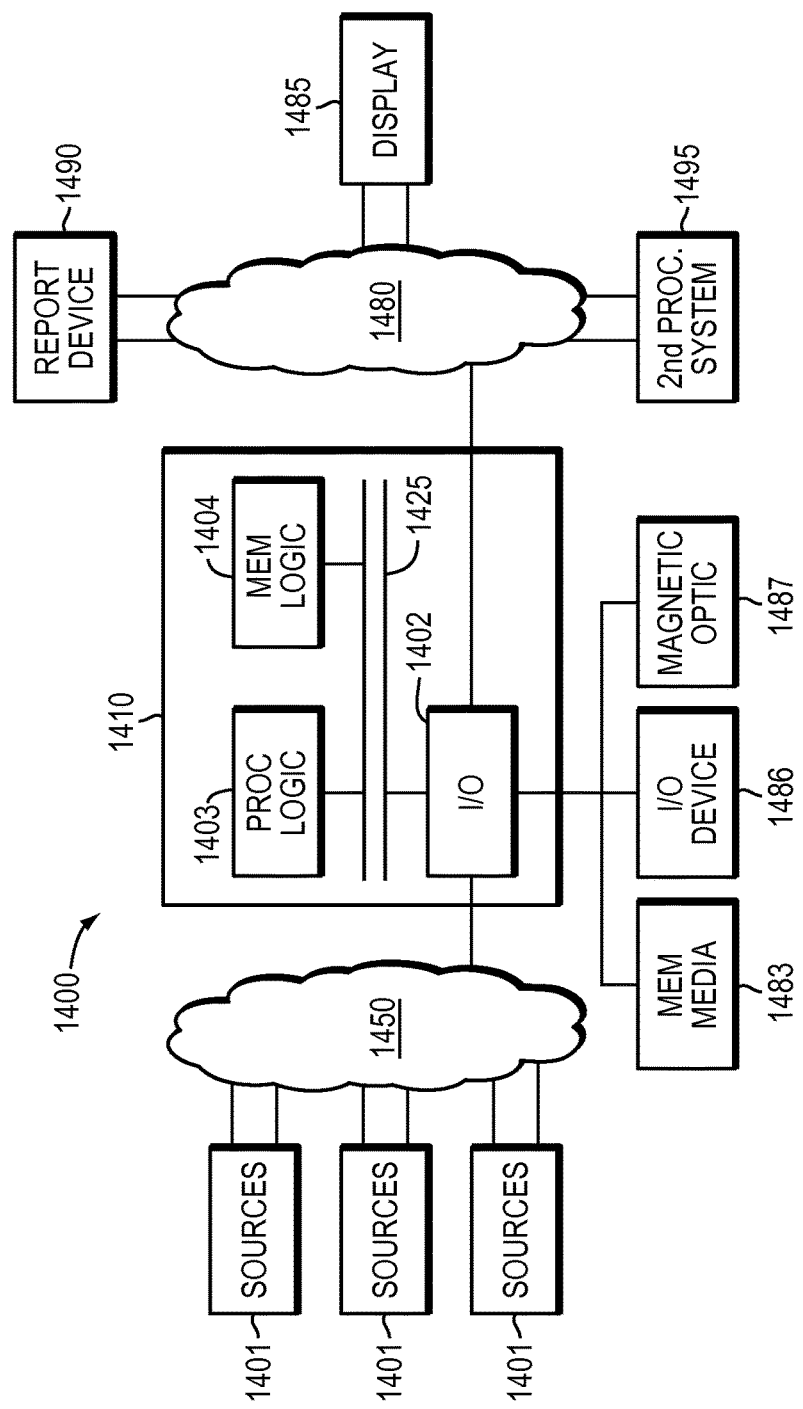
FIG. 14 is an example of an embodiment of an apparatus that may utilize the techniques described herein, in accordance with an embodiment of the present disclosure.
Figure 15:
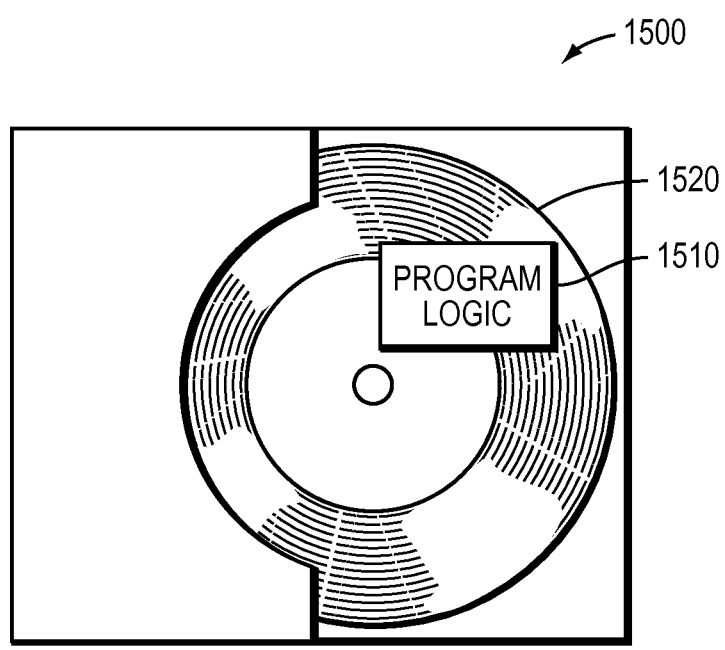
FIG. 15 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor 1403 to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1400. The logic 1534 may be the same logic 1440 on memory 1404 loaded on processor 1403. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 8 and 11.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system for data consistency, the system comprising:
   a storage system;
   an application running on a server; wherein the application comprises a virtual machine;
   the server with a server cache; wherein the server cache has a log; wherein the server cache is enabled to store memory information for the application;
   computer-executable logic operating in memory, wherein the computer-executable program logic is configured to enable one or more processors to execute: receiving a current IO from the application at the server cache, the current IO updating data stored on the server cache; writing the current IO to a location on a portion of the server cache segregated to the application by a hypervisor; wherein the application runs in the hypervisor; as to not overwrite previous data to which the current IO is directed; wherein the hypervisor is enabled to segregate writes from virtual machines to different areas in the server cache;
   updating, in the server cache, a location index of the data to correspond to the location where the current IO was written;
   recording a location of the previous data in the log;
   wherein the computer executable logic is further configured for:
   periodically transferring portions of content stored on the server cache to the storage system;
   wherein the storage system stores IO written to the a disk image of the application and the server cache represents IO written to memory, wherein the server cache has DRAM and Flash;
   wherein the writing the current IO so as to not to overwrite the previous data to which the current IO is directed further comprises: writing the previous data to the Flash; and writing the current IO in the DRAM; and wherein the recording the location of the previous data in the log includes recording the location of the previous data written in the Flash.

2. The system of claim 1 further comprising storage; wherein the storage is enabled to store data of the application.

3. The system of claim 1 the computer logic further configured to enable:
   receiving a request for a previous point in time for the application;
   reading the log to find the previous point in time;
   using the log, portion of the application stored on storage, and the server cache to create the previous point in time; and
   exposing the previous point of time to the application.

4. The system of claim 3, wherein the computer logic is further configured to enable:
   rolling the data of the application stored on the storage to the previous point in time.

5. A computer program product comprising:
   a non-transitory computer readable medium encoded with computer executable program code for replication of data, the code configured to enable the execution of:
   receiving an a current IO from an application at a server cache, the current IO updating data stored on the server cache; wherein the application comprises a virtual machine;
   writing the current IO to a location on a portion of the server cache segregated to the application by a hypervisor; wherein the application runs in the hypervisor; as to not overwrite previous data to which the current IO is directed; wherein the hypervisor is enabled to segregate writes from virtual machines to different areas in the server cache;
   updating, in the server cache, a location index of the data to correspond to the location where the current IO was written;
   recording the a location of the previous data in a log;
   periodically transferring portions of content stored on the server cache to a storage system;
   wherein the storage system stores IO written to a disk image of the application and the server cache represents IO written to memory, wherein the server cache has DRAM and Flash, and wherein the writing the current IO so as to not to overwrite the previous data to which the current IO is directed further comprises: writing the previous data to the Flash; and writing the current IO in the DRAM;
   and wherein the recording the location of the previous data in the log includes recording the location of the previous data written in the Flash.

6. The computer program product of claim 5 wherein storage is enabled to store data of the application.

7. The computer program product of claim 5 wherein the code further configured to enable the execution of:
   receiving a request for a previous point in time for the application;
   reading the log to find the previous point in time;
   using the log and the server cache to create the previous point in time; and
   exposing the previous point of time to the application.

8. The computer program product of claim 5 wherein the code further configured to enable the execution of:
   rolling the data of the application stored on the storage to the previous point in time.

9. A computer implemented method comprising:
   receiving a current IO from an application at a server cache, the current IO updating data stored on the server cache; wherein the application comprises a virtual machine;
   writing the current IO to a location on a portion of the server cache segregated to the application by a hypervisor; wherein the application runs in the hypervisor; as to not overwrite previous data to which the current IO is directed; wherein the hypervisor is enabled to segregate writes from virtual machines to different areas in the server cache;
   updating, in the server cache, a location index of the data to correspond to the location where the current IO was written;
   recording the a location of the previous data in a log;
   periodically transferring portions of content stored on the server cache to a storage system;
   wherein the storage system stores IO written to the a disk image of the application and the server cache represents IO written to memory, wherein the server cache has DRAM and Flash, and wherein the writing the current IO so as to not to overwrite the previous data to which the current IO is directed further comprises: writing the previous data to the Flash; and writing the current IO in the DRAM; and wherein the recording the location of the previous data in the log includes recording the location of the previous data written in the Flash.

10. The computer implemented method of claim 9 wherein storage is enabled to store data of the application.

11. The computer implemented method of claim 9 further comprising
receiving a request for a previous point in time for the application;
reading the log to find the previous point in time;
using the log and the server cache to create the previous point in time; and
exposing the previous point of time to the application.

12. The computer implemented method of claim 9 further comprising:
rolling the data of the application stored on the storage to the previous point in time.

13. The system of claim 1 wherein the system performs rollback of a VM or an application by rolling a replicated image back in time and by rolling memory back in time using a log.

14. The computer program product of claim 5 wherein the code is further configured to perform rollback of a VM or an application by rolling a replicated image back in time and by rolling memory back in time using a log.

* * * * *

UNITED STATES PATENT AND TRADEMARK OFFICE
CERTIFICATE OF CORRECTION

PATENT NO. : 10,055,146 B1
APPLICATION NO. : 14/585258
DATED : August 21, 2018
INVENTOR(S) : Assaf Natanzon et al.

Page 1 of 1

It is certified that error appears in the above-identified patent and that said Letters Patent is hereby corrected as shown below:

In the Claims

Column 13, Line 41, delete "to the a disk" and replace with --to a disk--

Column 14, Line 5, delete "receiving an a current" and replace with --receiving a current--

Column 14, Line 19, delete "recording the a location" and replace with --recording a location--

Column 14, Line 62, delete "recording the a location" and replace with --recording a location--

Column 14, Line 65, delete "to the a disk" and replace with --to a disk--

Signed and Sealed this
Twenty-eighth Day of May, 2019

Andrei Iancu
*Director of the United States Patent and Trademark Office*